United States Patent [19]

Ogane et al.

[11] Patent Number: 5,291,223
[45] Date of Patent: Mar. 1, 1994

[54] EXPOSURE UNIT FOR A MULTICOLOR IMAGE FORMING APPARATUS CAPABLE OF BETTER REGISTRATION OF THE MULTICOLOR IMAGES

[75] Inventors: Atsushi Ogane; Yozo Fujii; Tadashi Miwa; Isao Matsuoka; Hideo Satoh, all of Hachioji, Japan

[73] Assignee: Konica Corporation, Japan

[21] Appl. No.: 942,726

[22] Filed: Sep. 9, 1992

[30] Foreign Application Priority Data

Sep. 19, 1991 [JP] Japan .................... 3-239671
Oct. 8, 1991 [JP] Japan .................... 3-260699

[51] Int. Cl.⁵ .................... G03G 15/04; G03G 15/01
[52] U.S. Cl. .................... 346/108; 346/157; 358/296
[58] Field of Search .............. 346/108, 157; 358/296; 355/317, 326, 327

[56] References Cited

U.S. PATENT DOCUMENTS 4,531,828  7/1985  Hoshino .................... 355/327 X
4,591,903  5/1986  Kawamura et al. .............. 346/108 X
5,175,570 12/1992  Haneda et al. ................ 355/327 X

FOREIGN PATENT DOCUMENTS 63-261280  10/1988  Japan .................... 355/326

Primary Examiner—Joan H. Pendegrass
Attorney, Agent, or Firm—Jordan B. Bierman

[57] ABSTRACT

An exposure device includes a polygon mirror to scan a photoreceptors with a plurality of laser beams to write plural color component latent images. The polygon mirror receives two laser beams at its two mirrows which are arranged diagonal to each other and reflects the two laser beams in the opposite directions to each other so that a first laser beam scans from the first side to the second side of the photoreceptor. On the photoreceptor are provided sensors to output first and second position signals independently when the first and second laser beams pass respectively the reference position mark disposed at one side on the photoreceptor. The exposure device is controlled in accordance with the position signals so that the start timing of the first laser beam is determined on the basis of the first position signal which is obtained in the current scanning line of the first laser beam and that the start timing of the second laser beam is determined on the basis of the second position signal which has been obtained in the previous scanning line of the second laser beam.

9 Claims, 11 Drawing Sheets

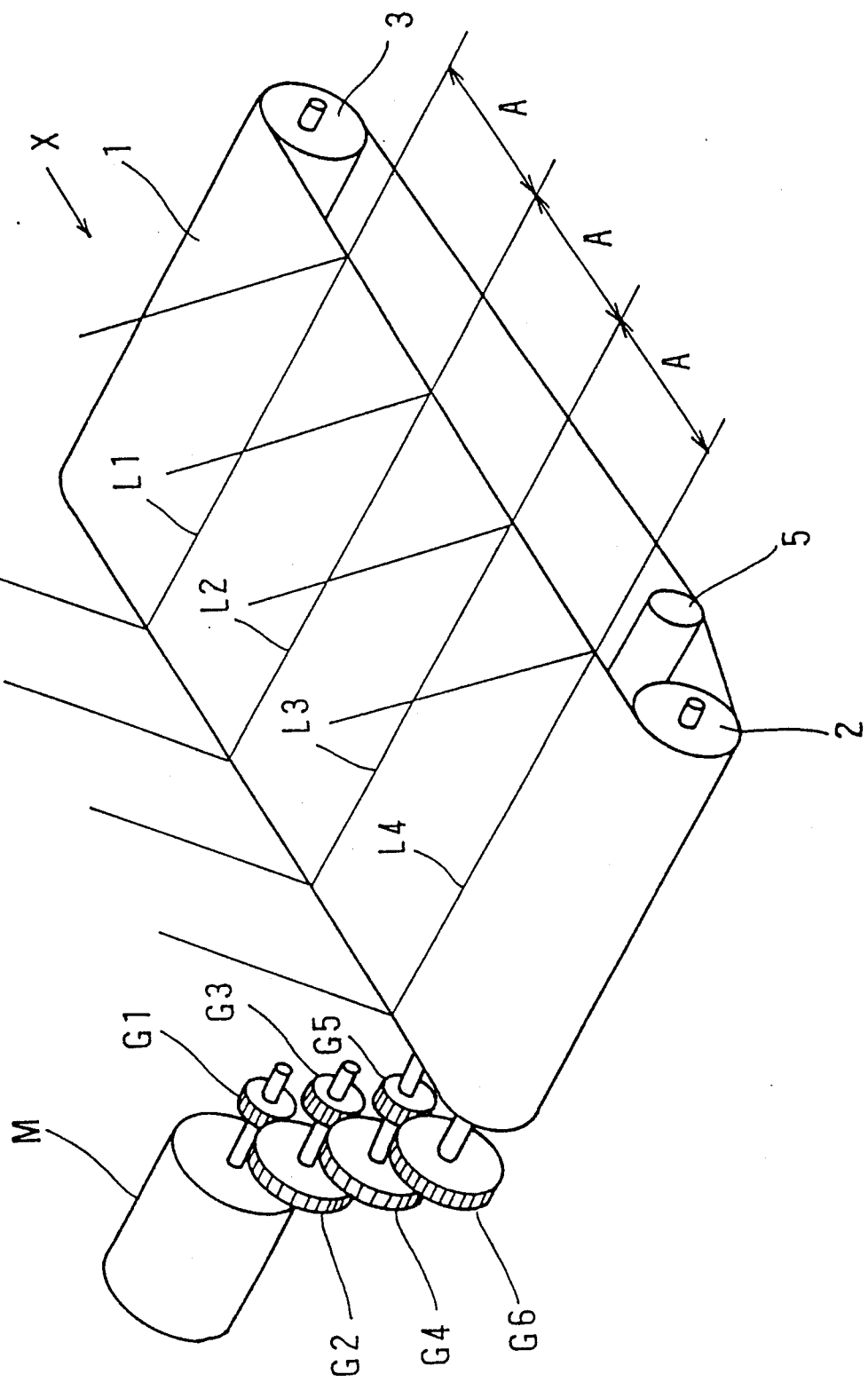

EXPOSURE UNIT FOR A MULTICOLOR IMAGE FORMING APPARATUS CAPABLE OF BETTER REGISTRATION OF THE MULTICOLOR IMAGES

BACKGROUND OF THE INVENTION

The present invention relates to a color image forming apparatus in which a toner image is formed on an image forming body by an electrophotographic method and the toner image is transferred onto a transfer sheet to obtain a color image.

As an image forming method by which a color image is obtained using an electrophotographic method, the following method is used: latent image formation and development corresponding to the number of separation colors of an original image are repeated on the image forming body; color toner images are superimposed on the image forming body; and after that, they are transferred so that a color image is obtained, as disclosed in, for example, Japanese Patent Publications Open to Public Inspection No. 75850/1985, 76766/1985, 95456/1985, 95458/1985, and 158475/1985.

As a color image forming apparatus to which the image forming method is applied, by which the latent image formation and development corresponding to the number of separation colors of the original image read in by a color scanner are repeated on the image forming body, the following apparatuses are used. The first example of them is an image forming apparatus in which exposing units and developing units corresponding to the number of separation colors (for example, three colors of yellow, magenta, and cyan, or four colors including black) are provided around a belt-shaped image forming body, and the second example is an image forming apparatus in which exposing units and developing units corresponding to the number of colors are provided around a drum-shaped image forming body. The color image forming apparatus provided with the belt-shaped image forming body will be described as follows.

The color image forming apparatus is structured in the following manner: a tension roller is provided to the belt-shaped image forming body on which a photoconductive body is coated or deposited; the belt-shaped image forming body is conveyed so that the surface of the belt-shaped image forming body is maintained always at a constant position when the belt-shaped image forming body is rotated, maintaining slidable contact with a guide member, which is a reference position, by tension of the belt due to pressure contact of the tension roller; an image forming means composed of a charger, exposing units, and a plurality of developing units in which different color toners (yellow, magenta, cyan, black) are contained, is provided around the belt-shaped image forming body; and the image forming means is provided around the rotating belt-shaped image forming body maintaining a constant gap therefrom.

Recently, the following color image forming apparatus is widely known in which: a latent image is formed by a beam into which color signals corresponding to yellow (Y), magenta (M), cyan (C), and black (K) are modulated, using a laser writing unit as an exposing unit by which a document image is rotatively scanned using a polygonal mirror by a laser beam outputted from a laser light source which is modulated or turned on and off, and the image forming body is exposed; the latent image is visualized by color toner development by the developing unit corresponding to each color; and each image is successively transferred onto a transfer sheet so that a multi-color, or full color image is obtained (Japanese Patent Publication Open to Public Inspection No. 156157/1986, etc.).

In the color image forming apparatus, the following method has been considered: a registration mark is formed on the image forming body, for example; the registration mark is detected by a sensor; a plurality of exposing units start exposing successively according to the detection; and thereby each latent image formation is started from the same point on the image forming body.

However, int he color image forming apparatus, when the registration mark formed on the belt-shaped image forming body is read out by a single sensor or a plurality of sensors, and a timing to start exposing from the exposing units is determined, a space between the sensor and the exposing unit and an arrangement space of a plurality of exposing units are required to be determined with exact accuracy (about ±0.01 to 0.1 mm) in this method, and therefore, it is actually difficult to position an arrangement space of a plurality of sensors or exposing units with mechanical accuracy (at the time of application of the present invention, the limitation is about ±0.3 to 0.5). Further, when the exposing unit is disassembled for maintenance, it is extremely difficult to assemble the unit at exactly the same position again.

Further, in the color image forming apparatus in which toner images are superimposed on the image forming body so that a color toner image is formed as described above, when an exposure starting position of a plurality of exposing units on the belt-shaped image forming body is not set within the unit of a pixel, for example, less than about 80 μm, quality of a color toner image is lowered. Especially when the belt-shaped image forming body is used, positioning control is difficult compared with a drum-shaped image forming body.

Further, conventionally, a method in which a sensor for exclusive use is used for position detection, has been accepted for detecting a pattern image provided previously on the image forming body (a photoreceptor) or transfer sheet, or a toner image formed on the photoreceptor or transfer sheet. In this case, since the sensor for exclusive use is provided to control the apparatus, it is disadvantageous in terms of space and cost, and further sufficiently accurate positioning is not obtained, so that the image quality is lowered.

Further, in an optical writing system, an optical system disclosed in Japanese Patent Publication Open to Public Inspection No. 95361/1983 is widely known for the purpose of compactness. However, in this case, since the scanning direction of the laser beam is opposite to the writing direction, a pattern image on the photoreceptor or a transfer sheet is necessary at both sides of the scanning direction.

SUMMARY OF THE INVENTION

In view of the foregoing problems, the object of the present invention is to provide a color image forming apparatus in which dispersion of a mounting position of the image forming body in a writing unit of the color image forming apparatus, slippage of a writing position due to a temperature change, or color doubling in a primary scanning direction of a laser beam caused by thrust or meandering of the image forming body at the time of rotation, is corrected, and even when positioning is not conducted with exact mechanical accuracy, slippage of an exposure starting point for forming a latent image when a plurality of latent images are repeatedly formed, can be prevented and thereby color doubling can be prevented.

In order to accomplish the above described object, the color image forming apparatus of the present invention in which superimposed toner images are formed on an image forming body by a plurality of laser writing units which irradiate a plurality of positions on one image forming body, a plurality of charging units corresponding to positions irradiated by laser beams of the laser writing units, a plurality of developing units, and a multi-color or full color image is obtained by transferring and fixing the toner image, is characterized in that: the laser writing unit is a symmetrical optical system in which a plurality of laser beams are incident onto symmetrical surfaces of one polygonal mirror, and laser reflected beams emerge in the opposite direction to the incident direction and scan on the image forming body; a pre-pattern provided to one side of the photoreceptor is irradiated by the laser beams for writing with respect to the primary scanning direction, reflected beams are received by light receiving sensors, and a pre-pattern position detection signal is generated; in the case of beams writing-in from the direction in which the pre-pattern is provided, the laser writing unit generates a writing-out timing signal during the same scanning as that of the pre-pattern detection signal; in the case of the laser beam which writes-in from the direction opposing the pre-pattern, the unit receives one-earlier pre-pattern detection signal and calculates a writing-out timing and generates a signal; and the writing-out timing signals are received respectively, and the image is written out.

Further, the color image forming apparatus of the present invention in which superimposed toner images are formed on an image forming body by a plurality of laser writing units which irradiate a plurality of positions on one image forming body, a plurality of charging units corresponding to the irradiated positions, and a plurality of developing units, and a multi-color or full color image is obtained by transferring and fixing the toner image, is characterized in that: the laser writing unit is a symmetrical optical system in which a plurality of laser beams use one polygonal mirror in common, the beams emerge in the opposite directions respectively and scan on the photoreceptor; a pattern provided in the vicinity of one side of the photoreceptor is irradiated by the laser beams for writing with respect to the primary scanning direction, reflected beams are received by light receiving sensors, and a pattern position detection signal is generated; in the case of the laser beam which writes-in from the direction in which the pattern is provided, the laser writing unit generates a writing-out timing signal during the same scanning as that of the pattern detection signal; in the case of the laser beam which writes-in from the direction opposing the pattern, the unit receives one-earlier pattern detection signal, calculates a writing-out timing of scanning and counts it, and after that, generates a writing-out timing signal; and the writing-out timing signals are received respectively, and the image is written out.

In order to accomplish the above-described object, a color image forming apparatus of the present invention in which superimposed toner images are formed on an image forming body by a plurality of laser writing units which irradiate a plurality of positions on one image forming body with a laser beam, a plurality of charging units corresponding to irradiated positions with a laser beam of the laser writing units, a plurality of developing units, and a multi-color or full color image is obtained by transferring and fixing the toner image, is characterized in that: the apparatus is provided with a plurality of rotatable driving transmission means which rotate the belt-shaped image forming body; and a space distance in the subsidiary scanning direction between respective writing-in positions of a plurality of writing-in positions by the laser writing units on the belt-shaped image forming body is integer times of a moving distance of the belt-shaped photoreceptor which is moved by one rotation of the rotatable driving transmission means.

BRIEF DESCRIPTION OF THE DRAWINGS

FIG. 11 is a perspective view showing a driving system of the belt-shaped image forming body.

DETAILED DESCRIPTION OF THE PREFERRED EMBODIMENT

Figure 1:
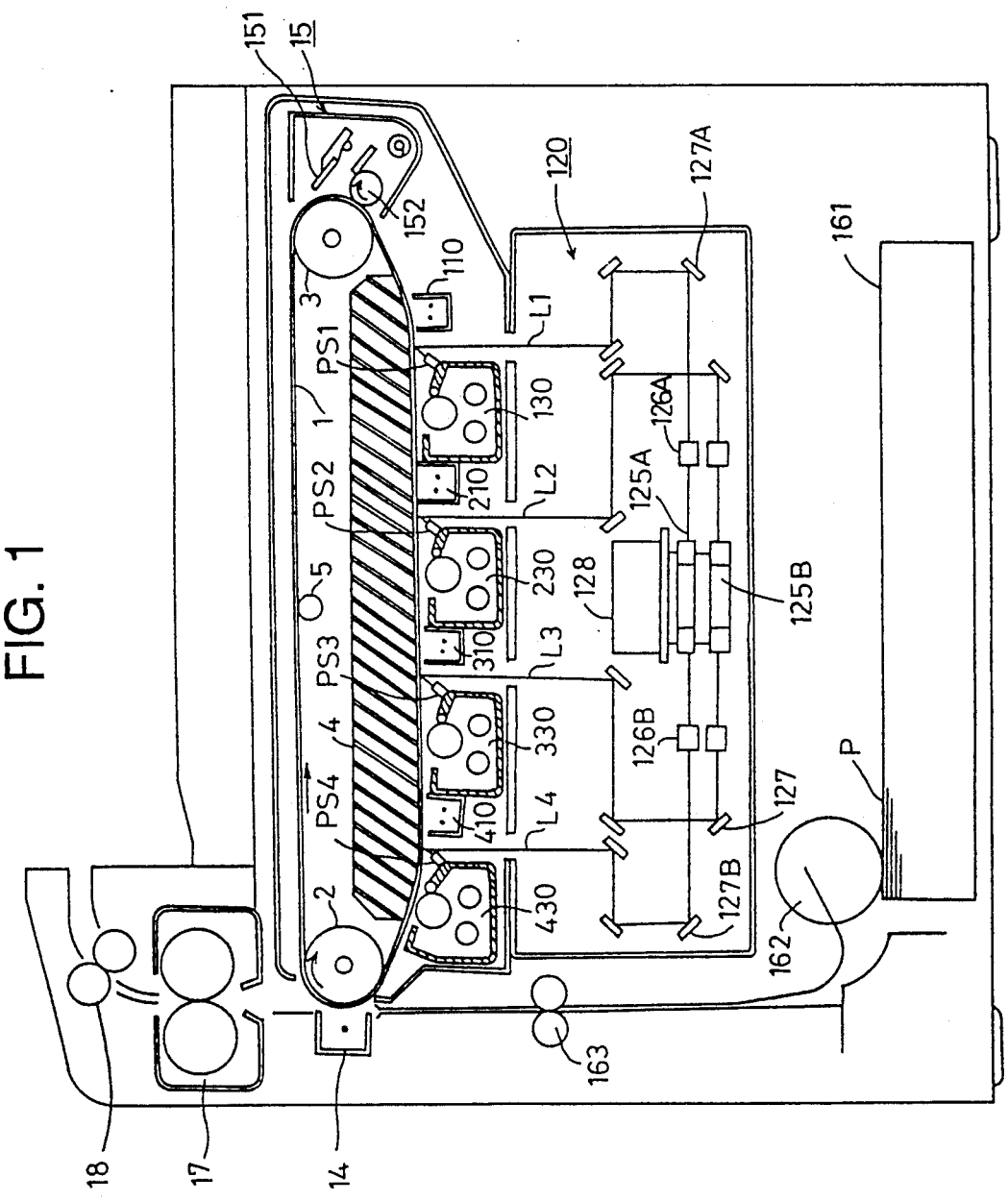
FIG. 1 is a view showing the overall structure of the color image forming apparatus according to the present invention.

Next, referring to the drawings, the example of the present invention will be described as follows.

Figure 2:
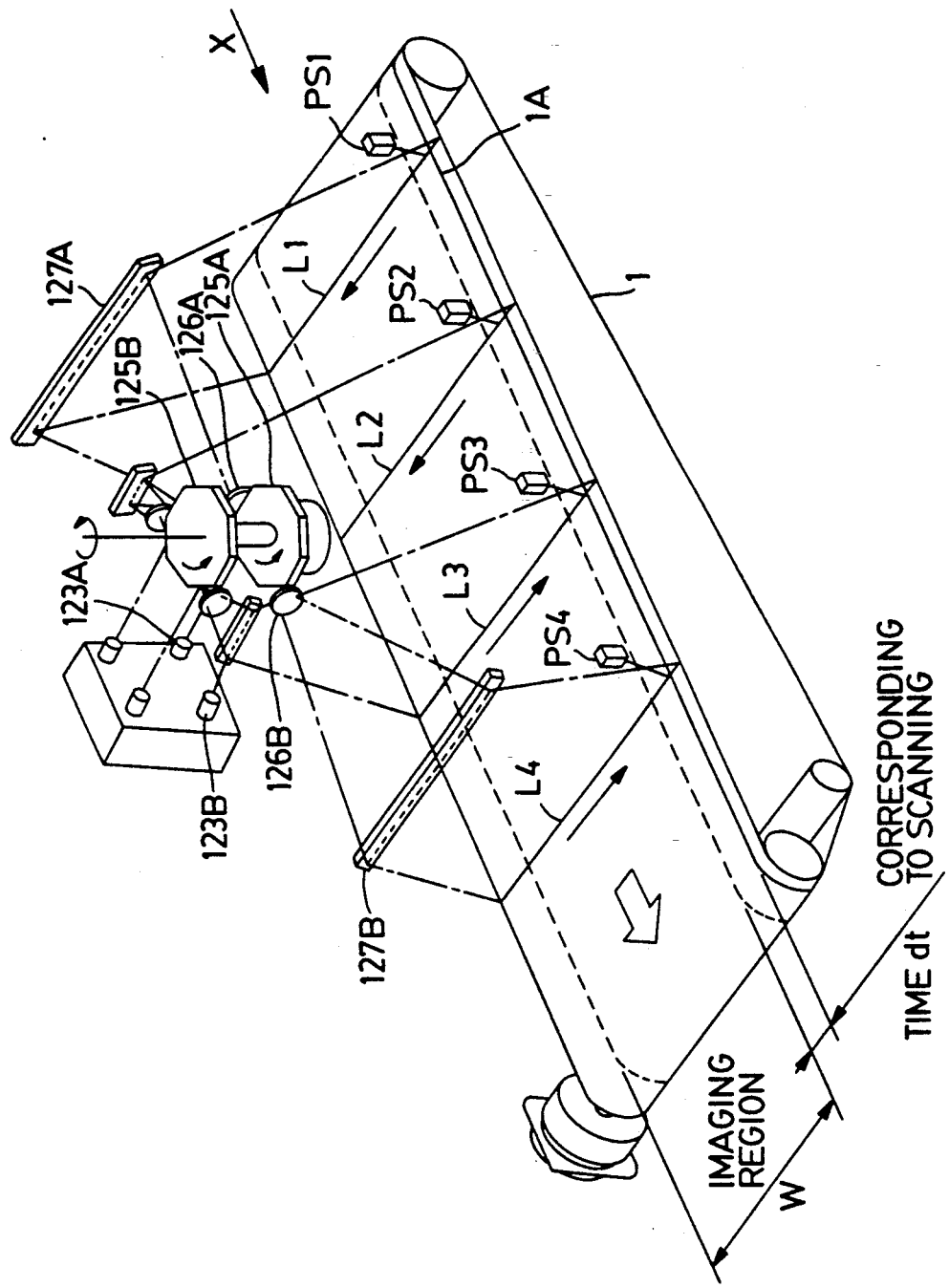
FIG. 2 is a perspective view showing the first example of a laser scanning exposure unit of the color image forming apparatus according to the present invention.
Figure 3:
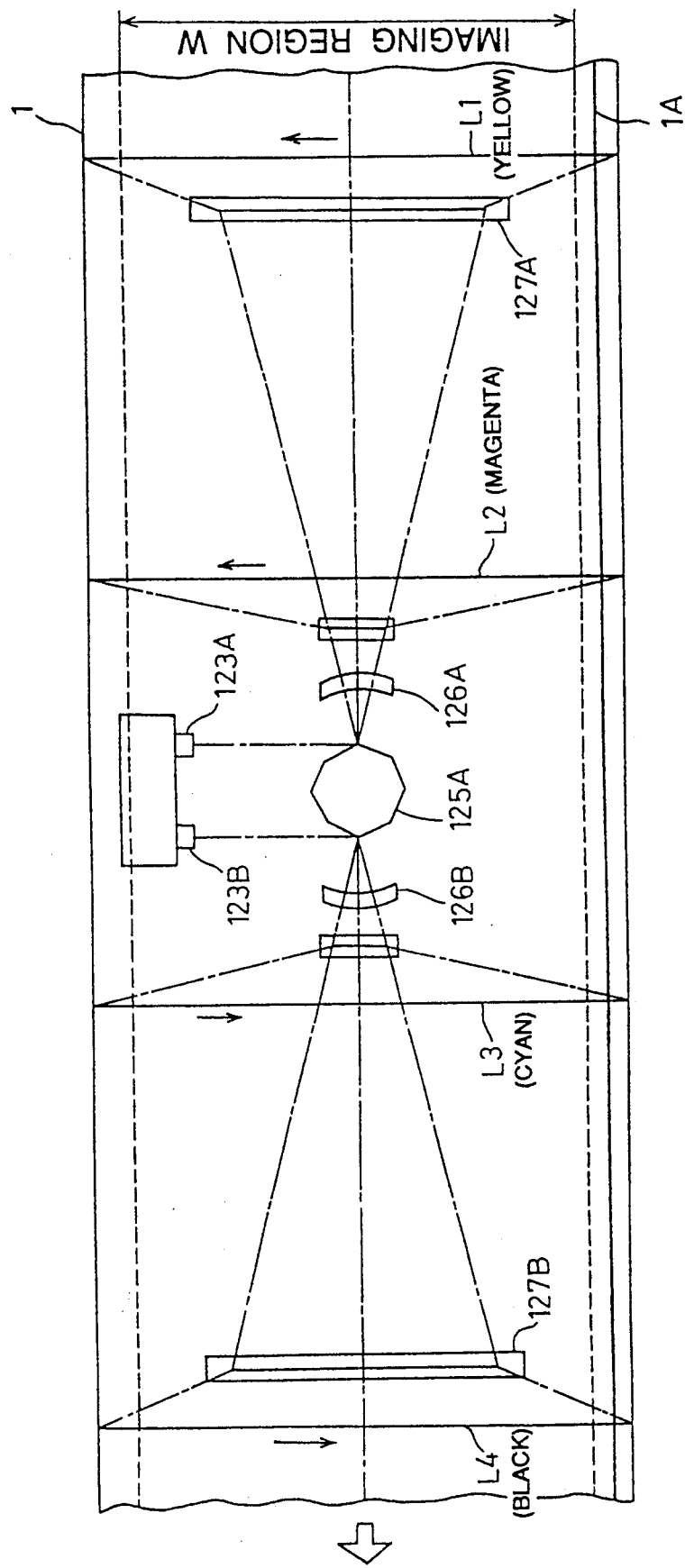
FIG. 3 is a plan view showing the positional relation of the laser scanning exposure unit and an image forming apparatus.

FIG. 1 is a view showing the overall structure of a color printer as an example of a color image forming apparatus provided with a belt-shaped image forming body as an example of the present invention. FIG. 2 is a perspective view showing the belt-shaped image forming body and an optical system of a laser scanning exposure unit. FIG. 3 is a plan view showing the positional relation of the laser scanning exposure unit and the image forming body of the present example.

In FIG. 1, the color image forming apparatus of the present example is provided with an image forming means composed of a plurality of chargers 110, 210, 310, 410, exposure scanning lines L1, L2, L3, L4, and developing units 130, 230, 330, 430, in which four different color toners are contained, around the belt-shaped image forming body 1, and forms a color image in the manner that yellow, magenta, cyan and black toner images are superimposed when the image forming body 1 is rotated by one rotation.

The belt-shaped image forming body 1 is a belt-shaped photoreceptor (which is referred to as a photoreceptor belt, hereinafter) in which a photoconductor is coated or vapor deposited on a flexible belt, and stretched around idle rollers 2, 3 and a guide member 4 which has curvature. Further, a tension roller 5 is provided to the photoreceptor belt 1, and when the photoreceptor belt 1 is rotated maintaining slidable contact with respect to the guide member 4, which is a reference position, by tension caused when the tension roller 5 contacts with the photoreceptor belt 1 with pressure, the photoreceptor belt 1 is conveyed while the surface of the belt is kept always at a constant position. Due to the above-described structure, the photoreceptor on the outer circumferential surface of the photoreceptor belt 1 is kept always at a constant positional relation with respect to the surface of the guide member 4 even when the belt is conveyed, and a long, wide stable image forming surface having large curvature can be structured, and thereby, image forming means of the same shape can be arranged in parallel with a constant space.

Although the photoreceptor belt 1 is used as the image forming body in this example, the present invention is not limited to the photoreceptor belt, but it can be applied to the conventional image forming body, which has a photosensitive layer, such as a photoreceptor drum.

A plurality of charging means, a plurality of exposure means, four developing means in which different color toners are contained, a transfer means, and a cleaning means are provided around the photoreceptor belt 1.

The charging means are provided in order to charge uniformly the photosensitive layer on the surface of the photoreceptor belt 1 with a predetermined polarity, and are conventional chargers 110, 210, 310, and 410 such as a corona charger, a scorotron charger, or the like. The exposure means is a semiconductor laser writing unit (a laser scanning exposure unit) 120, which exposes the surface of the photoreceptor belt 1 which has been charged by chargers 110, 210, 310, and 410, to form electrostatic latent images.

The developing means are four developing units 130, 230, 330, 430 in which different colored developers, for example, yellow (Y), magenta (M), cyan (C), and black (K) toners (developers) are contained respectively. These developing units 130 to 430 have a function in which an electrostatic latent image on the photoreceptor belt 1 is visualized into a toner image by the non-contact developing method. The non-contact developing method is different from the contact developing method, and does not damage the toner image formed previously on the photoreceptor belt 1, and does not prevent the photoreceptor belt 1 from moving, and thereby a superior color image can be obtained.

The fixing means transfers the toner image formed on the photoreceptor belt 1 onto a transfer material by a transfer unit 14 such as a transfer corona discharger. As the transfer member, a conventional transfer member such as a transfer drum may be used instead of the transfer unit 14.

The cleaning means 15 is provided with a cleaning blade 151 and a cleaning roller 152, and is structured so that it comes into contact with the surface of the photoreceptor belt with pressure and cleans the photoreceptor belt 1 when cleaning is conducted.

A color image forming process by the image forming apparatus structured as described above is conducted as follows.

At first, when a first color image signal outputted from an image reading-out apparatus provided outside the image forming apparatus is inputted into the laser writing unit 120, a laser beam is generated by a semiconductor laser 121 in the laser writing unit 120. The laser beam is projected onto a polygonal mirror 125 rotated by a driving motor 124 through a collimator lens 122 and a cylindrical lens 123 so that rotational scanning is conducted, and projected onto the circumferential surface of the photoreceptor belt 1 which is uniformly charged at a predetermined potential by chargers 110 to 410 through a $f\theta$ lens 126 so that a bright line is formed.

On the other hand, in the subsidiary scanning direction, a registration mark corresponding to a specific position of the photoreceptor belt 1 is detected by a photo-sensor, and modulation of a semiconductor laser 121 by an image signal is started on the basis of the detection signal, and a primary scanning line is determined. When scanning is started, in a primary scanning direction, a reference position is detected by a laser beam, modulation of the semiconductor laser 121 by a first color image signal is started on the basis of the detected signal, and the modulated laser beam scans the surface of the photoreceptor belt 1. Accordingly, a latent image corresponding to the first color is formed on the surface of the uniformly charged photoreceptor belt 1 by the primary scanning by the laser beam and the subsidiary scanning by conveyance of the photoreceptor belt 1. The latent image is developed by the developing unit 130 in which yellow toner is contained, and a yellow toner image is formed on the surface of the photoreceptor belt 1. After that, the photoreceptor belt 1 is conveyed while holding the yellow toner image on its surface, and enters the second color image formation.

That is, the photoreceptor belt 1 on which the yellow toner image is formed is, like the case of the first color image signal, charged again by the charger 210 when the belt is conveyed to the position of the charger 210, then a specific position on the photoreceptor belt 1 is detected, modulation of the the semiconductor laser of the laser writing unit 120 by the second image signal is started on the basis of the detected signal, a laser beam generated by the semiconductor laser is projected onto the polygonal mirror which is rotated by the collimator lens driving motor so that rotational scanning is conducted, and the laser beam is projected onto the circumferential surface of the photoreceptor belt 1 which is uniformly charged at a predetermined potential by the charger 210, through the $f\theta$ lens and the cylindrical lens so that the latent image is formed. The latent image is developed by the developing unit 230 in which magenta toner is contained as the second color. The magenta toner image is formed on the yellow toner image which has been formed already.

In the same way as the foregoing, the photoreceptor belt 1 on which the magenta toner image is formed as the second color, is conveyed further and, like the case of the second color image signal, uniformly charged by the charger 310 continuously, a latent image is formed by the laser writing unit 120, and the latent image is developed by the developing unit 330 in which cyan toner is contained so that a cyan toner image is formed. The photoreceptor belt 1 on which the cyan toner image is formed as the third color is further conveyed and, like the cases of the second, and third color image signals, uniformly charged by the charger 410, and a latent image is formed by the laser writing unit 120, and developed by the developing unit 430 in which black toner is contained, and the black toner image is superimposed on other toner images so that a color toner image is formed on the surface of the photoreceptor belt 1. That is, the color toenr image is formed while the photoreceptor belt 1 is rotated by one rotation.

D.C. and A.C. bias voltage is impressed upon the developing units 130 to 430, and reversal development (jumping development) is conducted on the photoreceptor belt 1 whose frame is grounded, by the non-contact development method. One component developer or two component developer can be used for the non-contact development. When one component developer is used, it is not necessary to provide a toner density control means, and it can reduce the size of the apparatus. However, the two component developer is superior in the stability of development, and is preferable for color regeneration.

As described above, the color toner image which has been formed on the surface of the photoreceptor belt 1, is transferred onto a transfer sheet which is supplied from a sheet feed cassette by a sheet fed roller 162 and is in timed relation with the color toner image by a timing roller 163. A high voltage with a reverse polarity to the toner is impressed upon the transfer sheet by the transfer unit 14 so that transfer s conducted.

Due to the foregoing, the transfer sheet on which the color toner image has been transferred is positively separated by the photoreceptor belt 1 which sharply changes its moving direction (small radius of curvature) along the idle roller 2, toner is thermally fused and fixed to the transfer sheet by the fixing means 17, and the transfer sheet is delivered from the apparatus main body by the sheet delivery roller 18.

The photoreceptor belt 1 by which the color toner image has been transferred onto the transfer sheet is conveyed further int he clockwise direction, and residual toner is removed and cleaned by the cleaning means 15, by which a cleaning blade 151 and a cleaning roller 152 are contacted with the belt with pressure. After cleaning has been completed, the apparatus enters a new image forming process.

The color image forming apparatus is a so-called one pass type in which an image forming means composed of a plurality of chargers 110 to 410, an exposure unit 120, and developing units 130 to 430 in which four different color toners are contained, is provided around the photoreceptor belt 1, and the color image is formed when yellow, magenta, cyan and black toner images are superimposed on the photoreceptor belt 1 during one rotation. It is needless to say that the present invention is not limited to the one pass type, but it may be a multi-rotation type in which each latent image formation and development are conducted at each one rotation of the image forming body.

Next, an adjustment (correction) of the laser writing unit 120 for the laser beam will be explained, before image formation, as follows.

As shown in FIG. 2 and FIG. 3, in the vicinity of the side edge surface outside an image region on the photoreceptor surface of the photoreceptor belt 1, a linear pre-pattern 1A previously formed by printing or the like, is provided in parallel with the side edge surface of the photoreceptor belt 1. The pre-pattern 1A is a reference by which an exposure starting position of the laser beam in primary and subsidiary scanning directions is determined, and a reference by which slippage of scanning lines L1, L2, L3, and L4 in the primary scanning direction is detected, which will be described later.

Light receiving sensors (reflection type photo-sensors) PS1, PS2, PS3, PS4 are provided respectively above positions in which the pre-pattern 1A and the scanning lines L1, L2, L3, L4 cross, and receive the reflection beams from the pre-pattern 1A by a primary scanning writing system beam of the laser beam.

Figure 6:
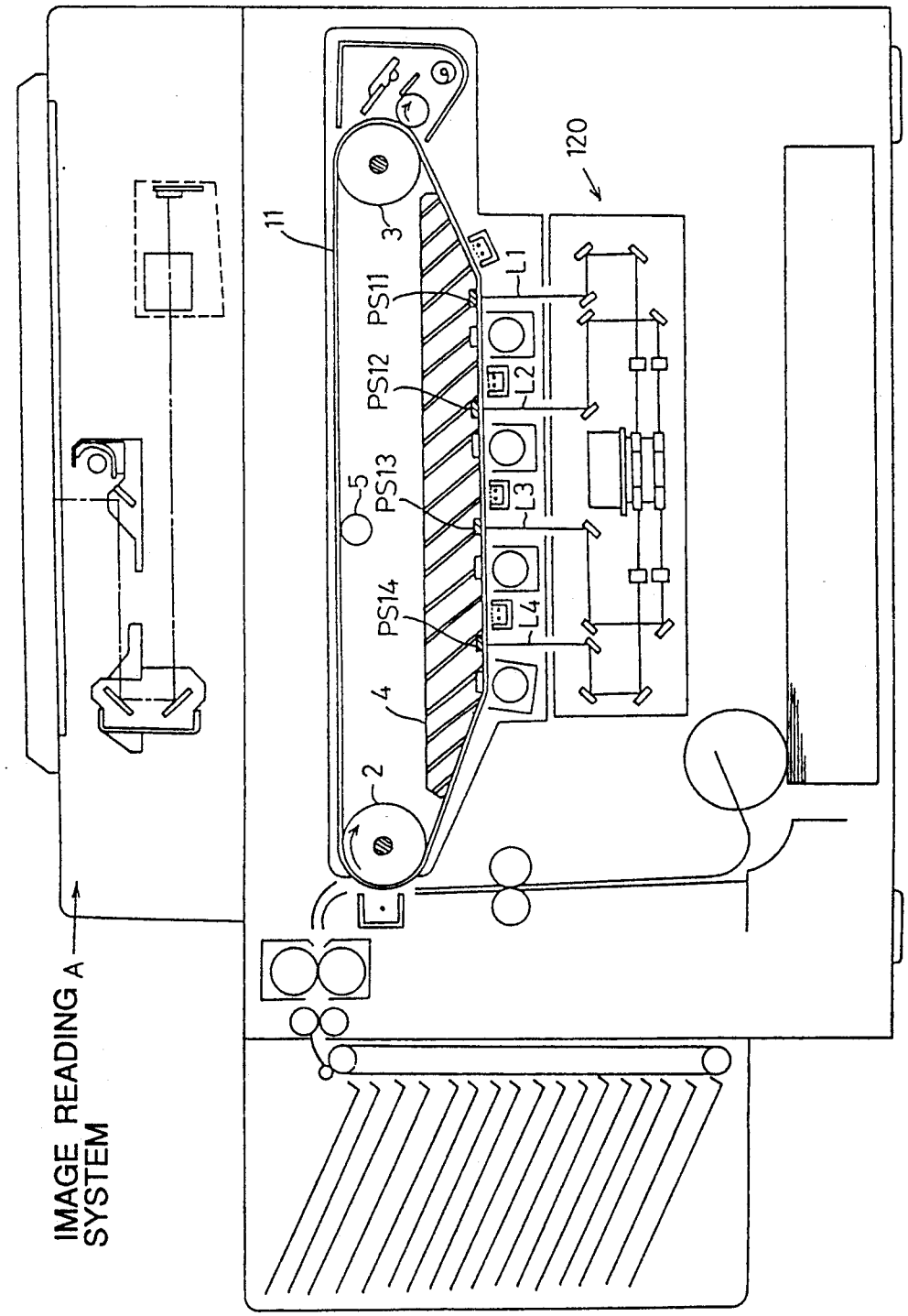
FIG. 6 is a view showing the overall structure of the second example of the color image forming apparatus according to the present invention.

An alternative may be structured in the following manner: the pre-pattern 1A of the photoreceptor belt 1 is formed on a transparent portion through which the laser beam is transmitted; a cut-out portion is formed on the guide member 4 as shown in FIG. 6; light receiving sensors PS11, PS12, PS13, PS14 are provided as a light detection means in the cut-out portion; and thereby, each color exposure light from the laser beam source is transmitted through the pre-pattern 1A, and the transmitted light is detected by light receiving sensors PS1 to PS4.

Figure 4:
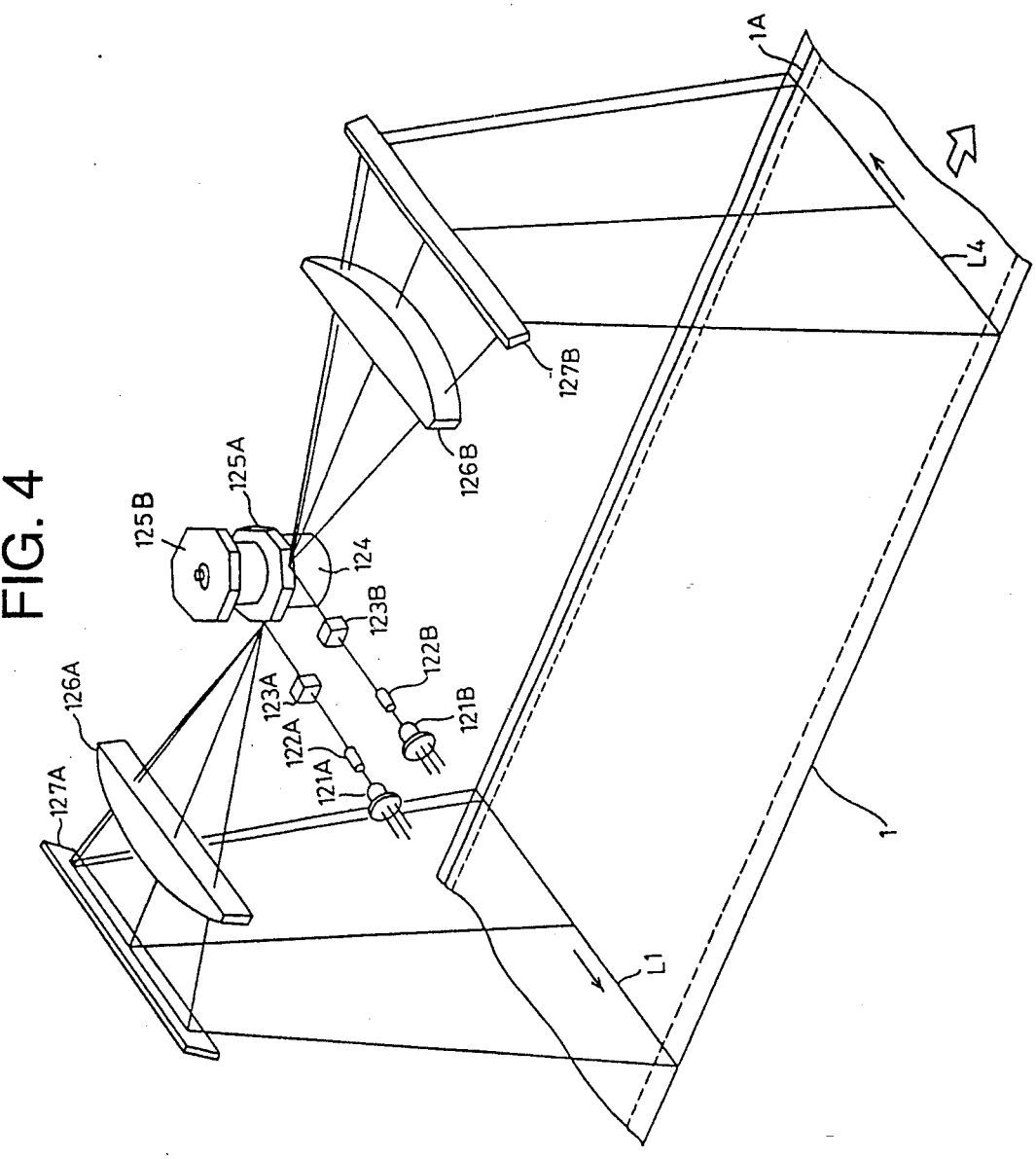
FIG. 4 is a partially enlarged perspective view of the laser scanning exposure unit according to the first example.

FIG. 4 is a partially enlarged perspective view showing a symmetrical type optical system of a laser scanning exposure unit of the first example according to the present invention. The exposure unit shown in the drawing, shows one of two alignments into which four laser beams of the example are arranged, and since these exposure units have almost the same structure, one laser scanning exposure unit 120 will be explained as an example as follows. In a color printer in FIG. 1, in order to reduce the distance between scanning lines, a refraction optical system in which a plurality of mirrors are used, is applied in a compact design.

A laser scanning exposure unit 120 scans the photoreceptor belt 1 with a laser beam emitted from a laser beam source by a deflector, and is structured by a symmetrical type optical system which is composed of: a first optical system composed of a laser beam source 121A, a collimator lens 122A, a cylindrical lens 123A, a polygonal mirror 125A which is driven by a high-speed rotation motor 124, an fθ lens 126A, and a mirror 127 as shown in FIG. 4; and a second optical system which is symmetrically provided to the first optical system and composed of the above-described parts. In the foregoing, the second polygonal mirror 125C is fixed on the same shaft as the polygonal mirror 125A, and is coaxially driven by the motor 124 in the same manner as the first optical system.

The laser beams which have been modulated by the image signal and made parallel by the collimator lens 122, are projected on the polygonal mirror 125A (125B) which is driven by the motor 124 so that scanning is conducted. The laser beams which have been used for scanning are reflected by the mirror 127, and irradiated on the photoreceptor surface of the photoreceptor belt 1 so that a scanning line L1 is formed. The photoreceptor belt 1 is rotated at low speed in the arrowed direction in the drawing, and subsidiary scanning is conducted on the image.

The laser beams which have been emitted from the second laser beam source 121 pass through a collimator lens 122B, and a cylindrical lens 123B and are made parallel, used for scanning by the same polygonal mirror 125A as the foregoing, pass through an fθ lens 126B, are reflected by a mirror 127B, and are guided to the photoreceptor belt 1 so that a scanning line L4 is formed. The scanning line L4 is formed in the manner that the scanning direction is opposite to the scanning line L1.

In this case, the space between the collimator lenses 122A and 122B is provided so that laser beams irradiate other planes of the polygonal mirror 125A respectively as shown in the drawings. For example, the polygonal mirror 125A in the drawing is an octahedron, and the collimator lenses are arranged in this manner: every second plane of the mirror is independently irradiated. Further, in the case of a hexahedron or tetrahedron, the adjacent plane is irradiated.

With respect to a polygonal mirror 125C which is provided on the same shaft as the polygonal mirror 125A and provided above the mirror 125A and rotated similarly, almost the same optical system as the above-described symmetrical type optical system is used, and scanning lines L2, L3 and L4 are formed. In this case, the scanning line L2 is formed in the same direction as L1, and scanning line L3 is formed in the same direction as L4 and in the opposite direction to L2.

In this case, the scanning line L1 is a bright line for yellow, L2 is for magenta, L3 is for cyan, and L4 is for black, and they are visualized by color toners of the corresponding developing units.

Further, as is understandable from the drawings, since primary scanning directions of scanning lines L1 and L4 on the photoreceptor belt 1 are opposite to each other, and those of L2 and L3 on the photoreceptor belt 1 are opposite to each other, the color image signal is inputted into a laser driving circuit so that output sequence of the color image signal at each line is made to be opposite to each other through an electric memory for one to several scanning lines.

Next, a correction operation which corrects slippages after slippage in the primary scanning direction of the laser beam has been detected using a pre-pattern IA provided on the photoreceptor belt 1 according to the present invention, will be explained as follows.

Figure 5:
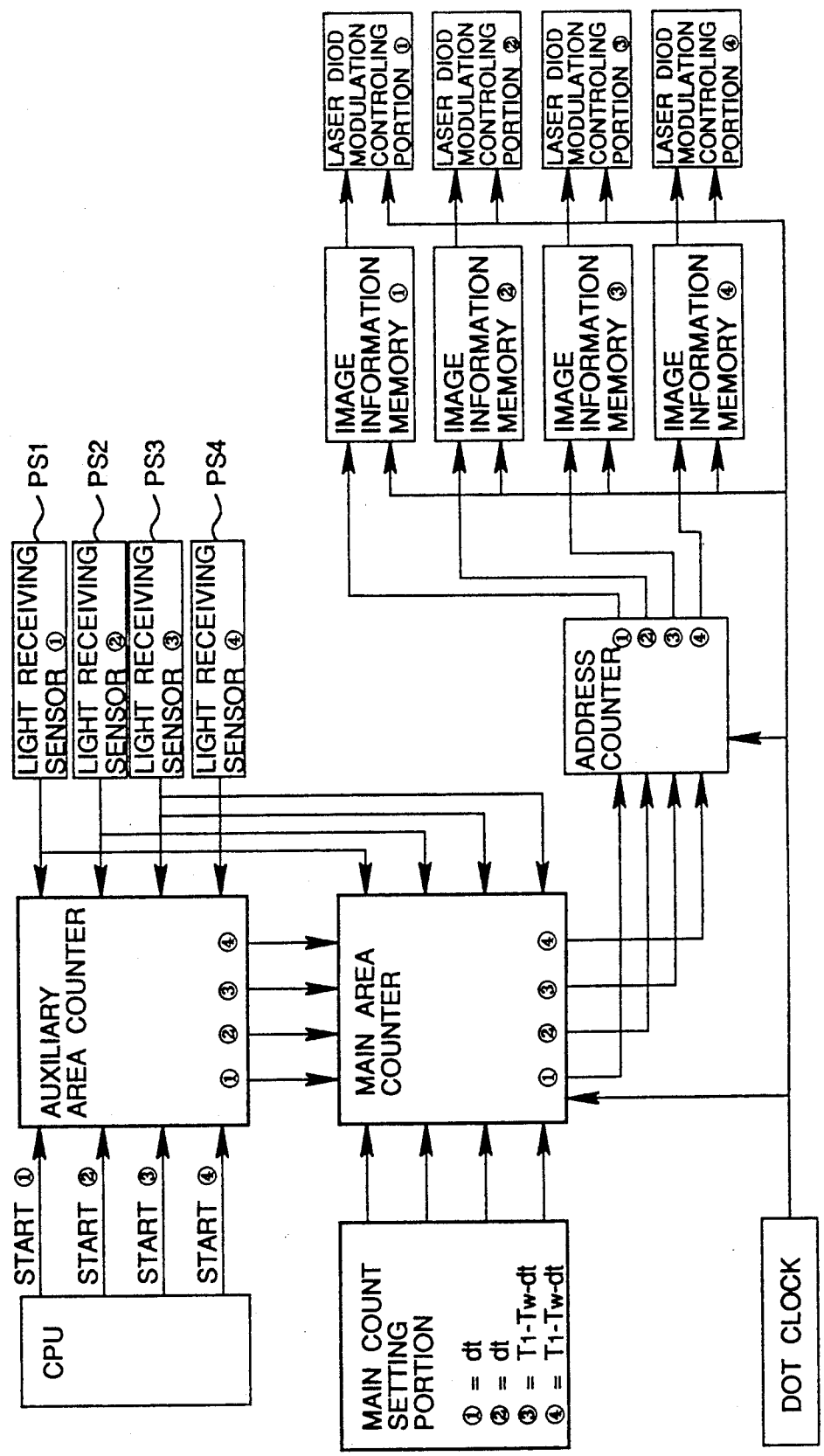
FIG. 5 is a block diagram of control of the laser scanning exposure unit.

FIG. 5 is a block diagram of an exposure correction operation in the primary scanning operation which prevents the slippage of the laser beam in the primary scanning direction. In the drawing, the subsidiary area counter is a counter by which the subsidiary scanning direction is shifted, the primary area counter is a counter by which the primary scanning direction is moved, and the primary count setting section is a section which sets the timing from a reference detection value of the pre-pattern 1A to a start of image writing.

A plurality of laser beams (four laser beams in the drawing) for writing irradiate the pre-pattern 1A of the photoreceptor belt 1 while scanning is conducted respectively, and the position of the photoreceptor is detected when light receiving sensors PS1, PS2, PS3, and PS4 receive the reflected light.

The symmetrical type optical system in which compactness and low cost of the laser writing unit are targeted, is an optical system in which one rotational polygonal mirror is irradiated by two laser beams. When the system is used, primary scanning lines L1 and L4 of the laser beams are opposite in the scanning direction, and L2 and L3 are opposite in the scanning direction, and therefore, the pre-patterns 1A are necessary in the vicinity of both sides of the surface of the photoreceptor belt 1. In this case, the manufacturing cost is high, and it is difficult to secure accuracy of the space between the two pre-patterns 1A formed on both sides of the surface, and therefore, color slippage can not be corrected highly accurately.

Due to the foregoing, in the present invention, the pre-pattern 1A is provided on one side, and the laser beam which scans from the pre-pattern side, starts image writing after the pre-pattern 1A has been detected and predetermined timing dT has passed (scanning lines L1 and L2 in FIG. 2, ① and ② in FIG. 5).

Scanning lines L3, L4 of the laser beams which scan from the opposite direction to the pre-pattern 1A write in the image signal outputted from a FIFO system (First In First Out System) memory after a time $(T_1 - T_w - dT)$ has passed, making a signal detected by the light receiving sensors PS3, PS4 at the one previous scanning a reference (scanning lines L3 and L4 in FIG. 3, ③ and ④ in FIG. 5).

When D is defined as dot density (number of dots per inch), $V_P$ is defined as a line speed (mm/sec.) of the photoreceptor belt, and W is defined as a width of the image area (mm), a scanning time per one line ; $T_1 = 25.4/(D \times V_P)$, and a scanning time per width of the image area ; $T_W = W/(25.4/D)$.

Since the time necessary for writing per one scanning line is extremely short, and it is actually negligible that the position of the photoreceptor belt 1 changes during the scanning time, color doubling in the primary scanning direction can be minimized.

Further, since light receiving sensors PS1 to PS4 are used, the light receiving sensors can be provided near the surface of the photoreceptor belt 1, and since they may be provided on one end surface side of the photoreceptor belt 1, the space for the light receiving sensor can be minimized. The above-described light receiving sensors are not limited to reflected light detection of the laser beam, but they may be used for transmitted light detection.

Referring to FIGS. 1 to 4, operations of the color image forming apparatus of the present example will be explained as follows.

When the power switch is turned on, the photoreceptor belt 1 is conveyed in the subsidiary scanning direction X when two idle rollers 2 and 3 are rotated clockwise at about 1/5 uniform velocity of the uniform line velocity at the time of image formation.

A laser scanning exposure unit 120 enters into the standby condition after displacement in the subsidiary scanning direction has been corrected when a housing in which the exposure unit is housed has been oscillated after processing has been conducted previously in a subsidiary scanning correction circuit.

When printing is conducted, while the photoreceptor belt 1 is conveyed at the image formation speed, the photoreceptor surface is uniformly charged by the charger 110. The above-described pre-pattern IA is detected by the light receiving sensor PS1 just before the exposure from the exposure unit 120, and displacement in the primary scanning direction is corrected by the detection signal, and thereby the image exposure for one line L1 is conducted. That is, the exposure unit 120 detects the displacement in the primary scanning direction on the photoreceptor belt 1 after a predetermined time has passed after the pre-pattern IA has been detected. When the exposure unit 120 corrects the displacement and irradiates the laser beam, image exposure is always started from a predetermined position of the photoreceptor belt 1.

After that, exposure scanning is conducted according to yellow data for one image area. Due to the foregoing, the latent image is formed at a predetermined position on the photoreceptor belt 1. The latent image is developed by yellow toner in the developing unit 130.

Next, the image formation according to magenta data, cyan data and black data is conducted in the same way as the foregoing, that is: the displacement of each exposure unit in the primary scanning direction on the photoreceptor belt 1 is detected by the primary scanning correction circuit and corrected; displacement in the subsidiary scanning direction is corrected; after that, the exposure unit 120 starts exposure after a predetermined time has passed so that exposure is started always from a predetermined position on the photoreceptor belt 1; and thereby, even when a plurality of exposure units are not positioned with exact mechanical accuracy, the exposure starting point for latent image formation is prevented from deviating when the latent image formation according to the number of the colors is repeatedly conducted, so that color doubling can be prevented.

In the foregoing, adjustment for primary scanning width (adjustment for a dot clock) is preferably conducted after displacement in the subsidiary scanning direction has been corrected before the stand-by condition. Further, the succeeding setting of the starting position for writing-out in the primary scanning direction may also be conducted before the stand-by condition.

FIG. 6 is a drawing of the overall structure of a color copying apparatus which is provided with a photoreceptor belt 11 on which translucent pre-patterns are formed as a second example of the present invention, and in the upper portion of which an image reading-out system A is provided. In the drawing, the same symbols and numerals as the aforementioned example are given to the portions having the same function as the aforementioned example. Differing points from the aforementioned example will be described as follows.

Translucent pre-patterns (not shown in the drawing) are formed at almost the same positions as the foregoing pre-patterns 1A in the vicinity of the side surface outside the image area on the photoreceptor belt 11 so that light can be transmitted through them. Cut-out portions are formed at the positions where the pre-patterns and the primary scanning lines L1, L2, L3, and L4 cross on the guide member 4, and light receiving sensors PS11, PS12, PS13, PS14 are located respectively at the cut-out portions. Light receiving sensors PS11 to PS14 detect light which is transmitted through translucent pre-patterns.

Figure 7:
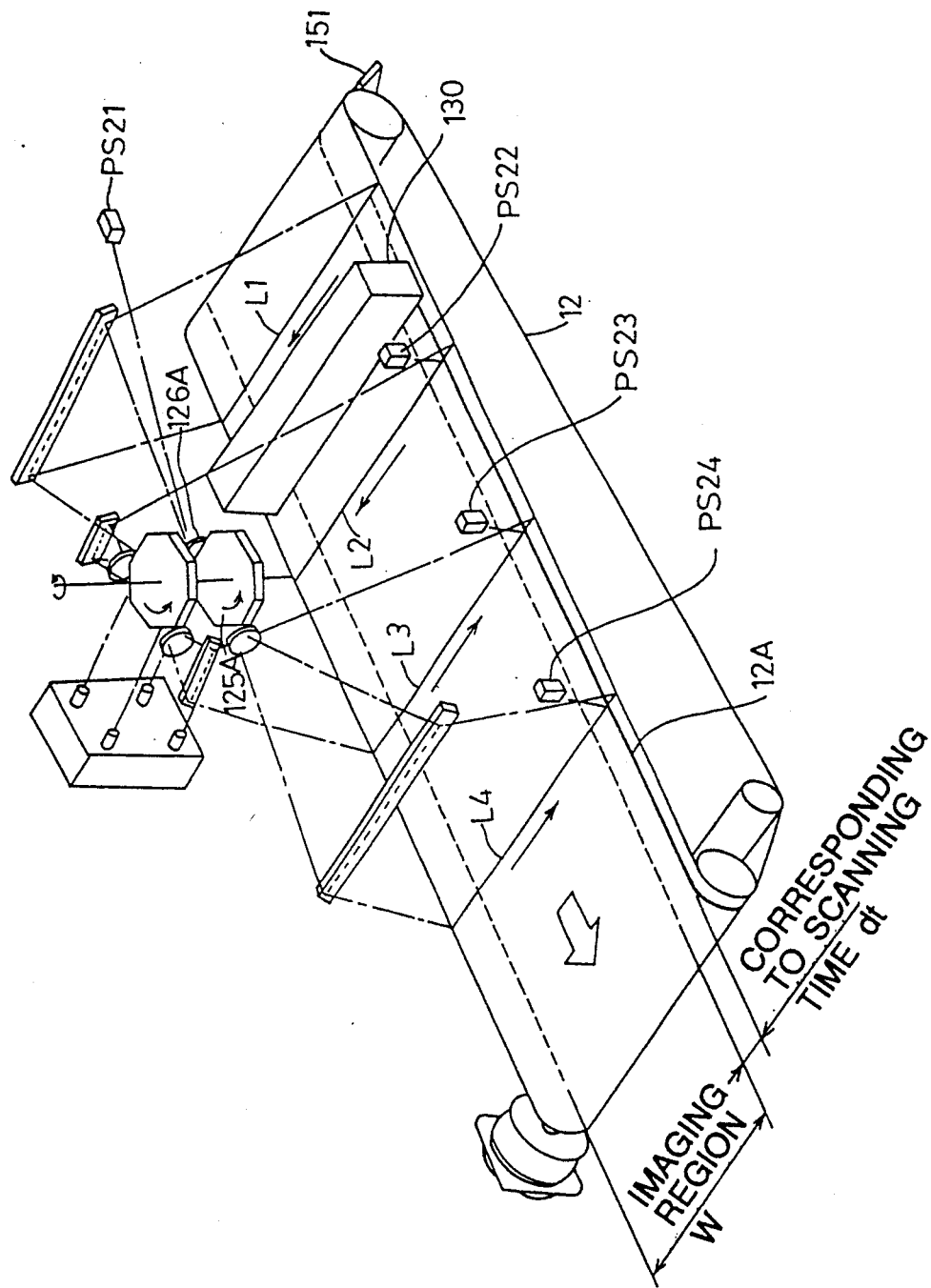
FIG. 7 is a perspective view of the laser scanning exposure unit according to the third example of the present invention.
Figure 8:
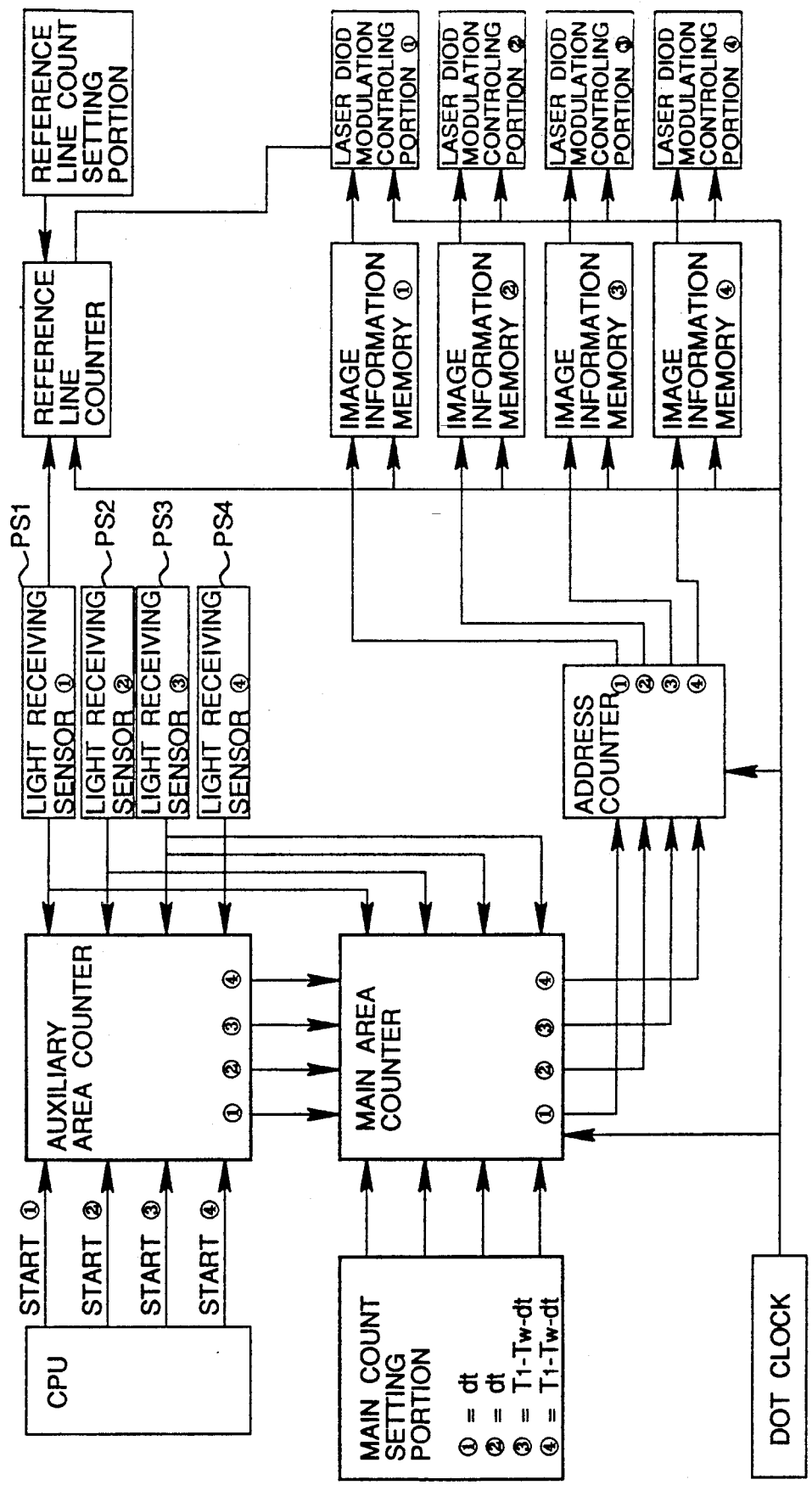
FIG. 8 is a block diagram of control of the laser scanning exposure unit.

Next, a color image forming apparatus of the third example will be explained as follows. FIG. 7 is a perspective view of the laser scanning exposure unit of the present invention. FIG. 8 is a block diagram for primary scanning correction which prevents the laser beam from deviating in the primary scanning direction. In the drawings, when symbols and numerals shown in the example, which will be described as follows, are the same as those of the first example, parts and portions have the same structure and function as those of the first example except when specially remarked upon.

A latent image of an exposure scanning line L1 is formed by the laser beam of the laser scanning exposure unit 120 on the surface of the photoreceptor belt 12 which has been charged previously. Prior to this, a latent image of the reference line 12A is formed near the end surface of the non-image area. The reference line 12A is developed by the first developing unit 130 and a visual image reference line 12A is formed. PS21 is a beam detector (a light receiving sensor), which receives the laser beam which is an incident beam passing through a $f\theta$ lens 126A from a rotational polygonal mirror 125A, generates an output signal, and outputs a rectangular-shaped beam detection signal according to an arbitrary set value by a beam detection circuit.

A plurality of (normally three) beams in the writing system located downstream from the primary scanning line L1, irradiate the visualized reference line 12A respectively while scanning is conducted, and when the reflected light is received respectively by light receiving sensors PS22, PS23, and PS24, a starting position in the thrust direction of the photoreceptor belt 1 is detected and controlled.

Generally, in a symmetrical optical system which aims at compactness and low cost of the laser writing unit, that is, the optical system in which the laser beam is irradiated onto two surfaces of a rotational polygonal mirror and the reflected light is projected in symmetrical directions, the scanning directions of laser beams (L1 and L4, L2 and L3) are opposite to each other, and therefore, the reference line 12A after development is necessary on both side surfaces of the photoreceptor belt 12. This has the following disadvantages: it results in useless consumption of toner; further, there is a possibility of staining caused by scattered toner; and dimensions in the width direction of the developing unit, the photoreceptor belt, and the cleaning unit become large.

Accordingly, one reference line 12A is provided on one side of the photoreceptor belt 12, and as in the aforementioned first example, the scanning line L2 starts writing after a predetermined timing dT has passed after the reference line 12A was detected, and the scanning line L3 and L4 which scan from the opposite direction to the reference line 12A make a signal which has detected the reference line 12A by one preceding scanning as a reference, and write-in the image signal outputted from the FIFO system memory after the time $(T_1 - T_W - d)$ has passed.

In the present example, the order of colored toner in developing units 130 to 430 is not limited to Y, M, C, K, but the first developing unit 130 may contain black toner, for example, in order to detect the first reference line 12A easily.

Further, in the present example, at first, laser writing-in units 120 are positioned with ordinary mechanical accuracy ($\pm 0.3$ to $0.5$ mm), and after that, a focus point of the laser beam is adjusted, and a minute displacement of one scanning width or one dot width is corrected. Accordingly, even when meandering or movement in the thrust direction of the rotating photoreceptor belt occurs, fine adjustment is conducted at each scanning line so that the image can be formed, and therefore the present example is specifically effective for color image formation in which images are registered upon each other.

As described above, the laser writing unit in the color image forming apparatus of the present invention accomplishes easily and highly accurately positioning of dots of colors in the primary scanning direction which is one of the most important factors which determine the recording image quality, and has superior effects by which color doubling is prevented and a high quality image can be formed. Especially, the laser writing unit of the present example provides an effective means in the exposure scanning writing unit of a registration type of color image forming apparatus such as an electrophotographic type one.

An improvement of a control means for the writing timing of the writing unit has been described heretofore.

Next, an example in which the structure of the writing unit is improved in order to accomplish the object of the present invention, will be described as follows.

Figure 9:
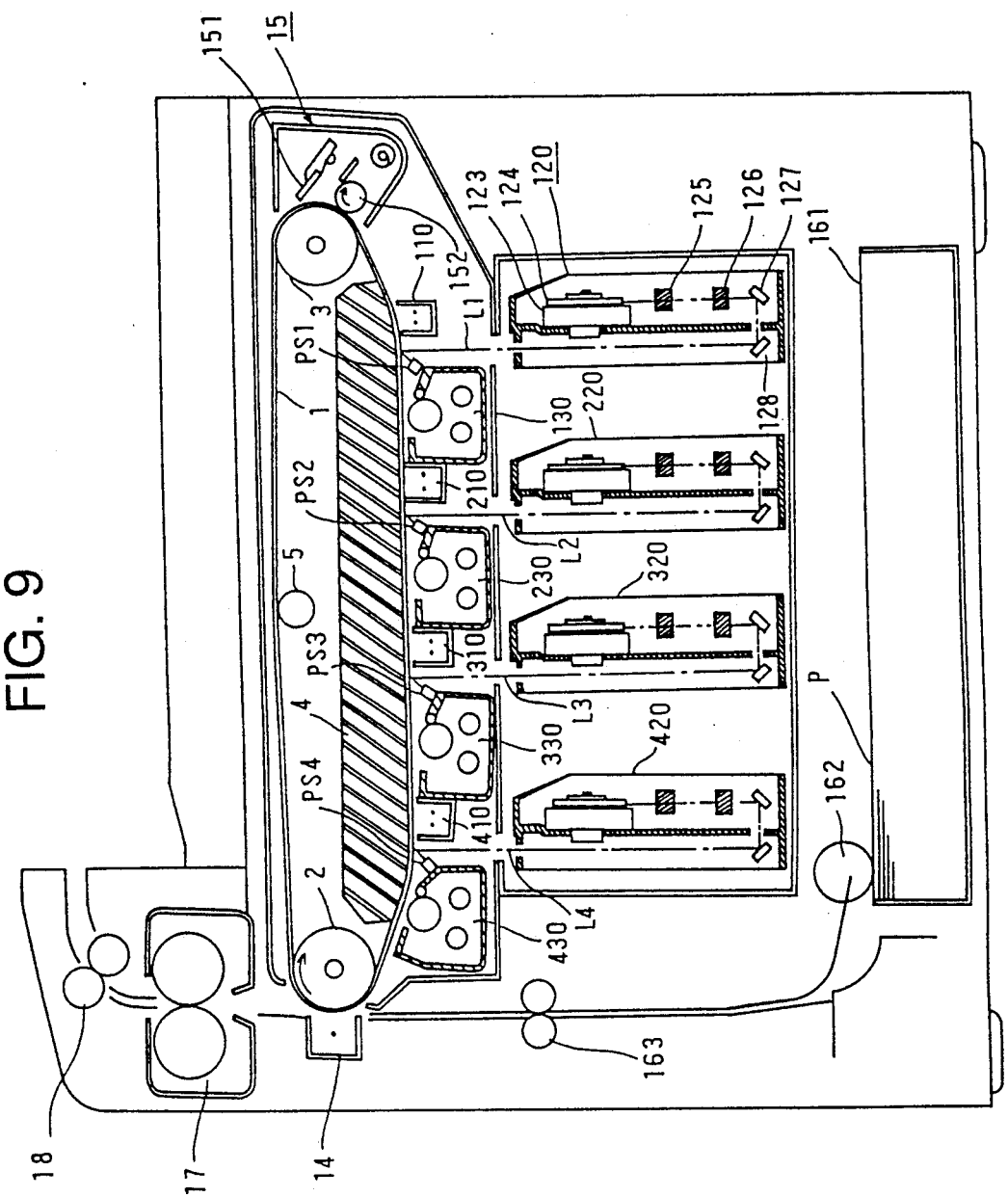
FIG. 9 is a view showing the overall structure of the color image forming apparatus according to the present invention.
Figure 10:
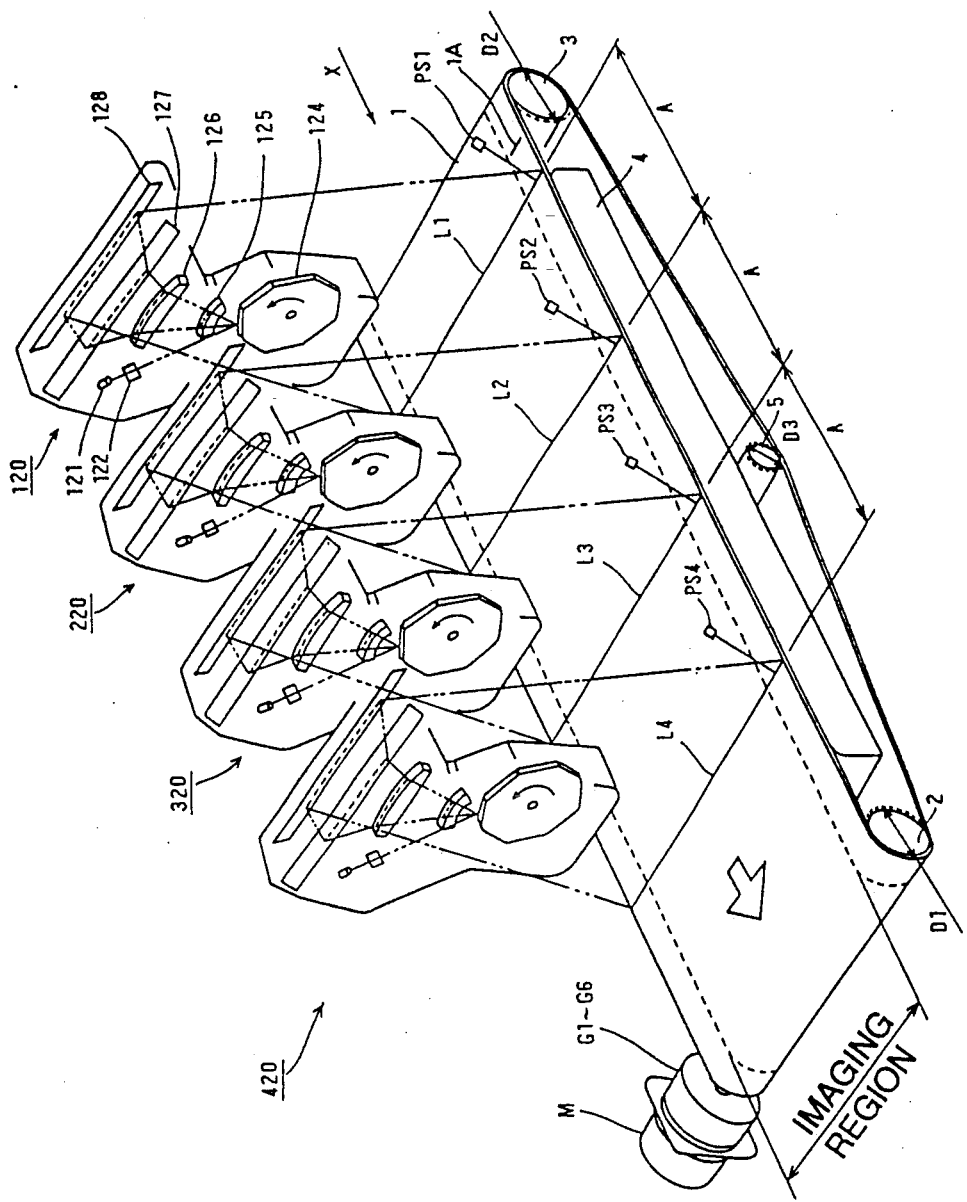
FIG. 10 is a perspective view of the laser scanning exposure unit of the image forming apparatus according to the present invention.

In the photoreceptor belt 1 in this example, as shown in FIGS. 9, 10, 11, a reflection member is provided on the photoreceptor as a registration mark 1A in the vicinity of the side surface outside an image area on the photoreceptor surface of the photoreceptor belt 1, and the light receiving sensors PS1, PS2, PS3, and PS4 are arranged in the manner that the reflected light of the exposure beam is received by the light receiving sensors PS1, PS2, PS3, and PS4. Due to the foregoing, a reference by which an exposure starting position in the primary scanning direction and subsidiary scanning direction X by the laser beam is determined, and a reference by which a displacement in the subsidiary scanning direction of the primary scanning line L1, L2, L3, L4 is detected, are formed.

The laser scanning exposure unit scans the photoreceptor belt 1 with a deflector by the laser beam from the laser light source, and is composed of four optical systems, for example, as shown in FIGS. 9 and 10.

The first optical system is composed of: a semiconductor laser 121; a collimator lens 122; a polygonal mirror 124 which is rotated by a driving motor 123 rotating at high speed; an fθ lens 125; a cylindrical lens 126; and a mirror 128, and forms the primary scanning line L1.

In the same manner as the foregoing, the second, third, and fourth optical systems have the same structure as the first optical system, and form the primary scanning lines L2, L3, and L4.

In this case, the primary scanning line L1 is a bright line for yellow, L2 is a bright line for magenta, L3 is a bright line for cyan, and L4 is a bright line for black, and they are visualized respectively by color toners of corresponding developing units 130, 230, 330, and 430 when the photoreceptor belt 1 is conveyed in the subsidiary scanning direction X.

The rotation of a motor M is reduced by a gear train G1, G2, G3, G4, G5, and G6, and transmitted to a driving roller 2. The photoreceptor belt 1 is wound around the driving roller 2, the idle roller 3, the guide member 4, and tension roller 5, and rotated.

Each member of driving transmission means composed of the gear train (G1 to G6), and rollers (2, 3, 5) generates generally periodical variation and vibration due to a machining error or to eccentricity caused during assembly work, at each rotation.

Therefore, an error is generated at each subsidiary scanning starting position of a plurality of the primary scanning lines L1, L2, L3, L4, and color doubling is generated when a plurality of images which are successively formed on the photoreceptor belt 1 are registered, so that a superior color image can not be obtained.

Accordingly, in the present invention, an integral multiple of the length in which the photoreceptor belt 1 is conveyed by each rotation of the driving transmission member composed of the gears G1 to G6, the driving roller 2, the idle roller 3, and tension roller 5, by which the photoreceptor belt 1 is rotated at constant speed, is defined as a space A between writing exposure positions in the subsidiary scanning direction X of the primary scanning lines L1, L2, L3, and L4. That is, when the diameter of the driving roller 2 is D1, the diameter of the idle roller 3 is D2, and the diameter of the tension roller is D3.

$$A = N_1 \times \pi D_1 = N_2 \times \pi D_2 = N_3 \times \pi D_3$$

($N_1$, $N_2$, $N_3$ are integers.)

Values of A, $D_1$, $D_2$, and $D_3$ are set so that the space A satisfies the above equation. At least, they are set so that the value of the driving roller 2 satisfies the above equation.

In the above equation, since the photoreceptor belt 1 is formed by a thin film-shaped supporting member, its thickness is neglected. However, to be exact, the space A is an integral multiple of the movement distance of the photoreceptor belt 1 which is moved by one rotation of each roller or gear after the thickness of the photoreceptor is added.

Next, the gear train G1 to G6 shown in FIG. 11 will be explained as follows.

When the number of revolutions of gears are given respectively by $n_1$, $n_2$, $n_3$, ... $n_i$(rev/sec), the movement length $B_i$ on the photoreceptor belt 1 per one revolution of each gear is $$B_i = V_P \times 1/n_i (mm)$$

(mm)

where VP = the line speed (mm/sec) on the photoreceptor belt 1

$$A = M_1 \times B_1 = M_2 \times B_2 = M_3 \times B_3 = \ldots = M_i \times B_i$$

($M_1$, $M_2$, $M_3$, ... $M_i$: integers)

Values of A, $n_1$, $n_2$, $n_3$, ... $n_i$, are set so that the space A satisfies the above equation.

The above equation is satisfied when an integral multiple of the least common multiple of the movement distance of the photoreceptor belt 1 which is moved by each one revolution of the driving transmission member such as a plurality of rollers and gears, is the space A between exposure positions. Spaces A in three positions shown in the drawing are not necessarily equal.

When the diameter of the roller, the pitch circle diameter of the gear, and the space A are set in the above described manner, uneven movement of the photoreceptor belt 1 at each writing position is reduced, color doubling in the subsidiary scanning direction X is reduced, and thereby, the image quality is greatly improved.

Next, displacement detection in the subsidiary scanning direction of the primary scanning lines L1, L2, L3 and L4 will be explained as follows.

When the mechanical accuracy of the space A among the primary scanning lines L1, L2, L3, and L4 is within an allowance (specifically, lower than one pixel unit which is actually necessary) in the assembled apparatus, there is no problem. However, when the overall accuracy exceeds the allowance due to the total of the threshold accuracy of various machining and assembling operations, it is necessary to correct the positions of laser exposure units 120, 220, 320 and 420.

In this case, the registration mark 1A is exposed by laser exposure units 120, 220, 320, and 420 while the photoreceptor belt 1 is moved, and the reflected light is received by light receiving sensors PS1, PS2, PS3 and PS4, and thereby the interval $T_A$ of each light receiving signal is measured.

After that, the setting space A is adjusted by moving the positions of laser exposure units so that the setting interval $T_O$ which is calculated by the line speed $V_P$ of the photoreceptor belt 1 and the interval $T_A$ of each light receiving signal are equal (within the allowance).

Each laser exposure unit may be adjusted by various methods such as the following: the whole unit is moved in the subsidiary scanning direction; since the amount of movement is minute, the whole unit is oscillated in the subsidiary scanning direction; and a mirror in the unit is rotatively oscillated, and the position of the primary scanning line is moved.

In the above-described example, exposure units are provided at each scanning line, however, this example can be applied to the symmetrical type optical system shown in FIG. 2.

As explained above, the laser scanning exposure unit in the color image forming apparatus of the present invention has the following superior effects: when the color image is formed in the manner that a plurality of images are formed on one belt-shaped image forming body while the image forming body is rotated by one revolution, positioning of colors in the subsidiary scanning direction which is one of the most important factors which determine the recording image quality, is accomplished easily and highly accurately; color doubling is prevented; and thereby a high quality image can be formed. Especially, in the exposure scanning writing unit of a registration type color image forming apparatus such as an electrophotographic type one, it can provide an effective means.

What is claimed is:

1. An apparatus for forming a color image by irradiating a rotatable photoreceptor with a plurality of laser beams to write plural color component latent images and by developing the latent images with a plurality of developing devices to form plural color component toner images, comprising
   said rotatable photoreceptor having a given width in a direction perpendicular to the rotating direction thereof and provided with a reference position mark at the first side of the width;
   exposure means for scanning said photoreceptors with a plurality of laser beams to write plural color component latent images, including
   a laser generator to generate the plurality of laser beams,
   a rotatable polygon mirror having a mirror at each edge sides thereof to reflect a laser beam so as to scan the photoreceptor in the width direction, wherein the polygon mirror receives two laser beams at two mirrors thereof which are arranged diagonal to each other and reflects the two laser beams in the opposite directions to each other so that a first laser beam of the two laser beams scans from the first side of the photoreceptor to the second side opposite to the first side and a second laser beam scans from the second side to the first side;
   signal means for outputting first and second position signals independently when the first and second laser beams pass respectively the reference position mark provided at the first side on the photoreceptor; and
   control means for controlling exposure means in accordance with the position signals so that the start timing of the first laser beam to write a latent image is determined on the basis of the first position signal which is obtained in the current scanning line of the first laser beam and the start timing of the second laser beam to write a latent image is determined on the basis of the second position signal which has been obtained in the previous scanning line of the second laser beam.

2. The apparatus of claim 1, wherein the exposure means includes two pieces of the rotatable polygon mirror so as to scan the photoreceptor with four laser beams.

3. The apparatus of claim 2, wherein the two pieces of the rotatable polygon mirror are mounted in tandem on the same shaft and are driven by the same driving source.

4. The apparatus of claim 2, wherein the exposure means writes yellow, magenta, cyan and black color component images with the four laser beams.

5. The apparatus of claim 1, wherein the photoreceptor is an endless belt type photoreceptor.

6. The apparatus of claim 1 wherein said photoreceptor is an endless belt; said apparatus further comprising means for rotating said photoreceptor, wherein said photoreceptor is moved by a distance D by one rotation of said rotating means; and
   exposure means for driving said plurality of laser beams to form plural scanning lines in parallel, in a width-wise direction, on said photoreceptor, wherein each of said scanning lines is arranged with an equal pitch A, and wherein said pitch A is an integer multiple of distance D.

7. The apparatus of claim 6, wherein the rotating means includes a plurality of rotation members, and wherein the pitch A is made integer times of the least common multiple among distances D moved by each one rotation of the plurality of rotation members.

8. The apparatus of claim 7, wherein the plurality of rotation members are a roller to rotate the photoreceptor.

9. An apparatus for forming a color image by irradiating a rotatable photoreceptor with a plurality of laser beams to write plural color component latent images and by developing the latent images with a plurality of developing devices to form plural color component toner images, comprising
   said rotatable photoreceptor having a given width in a direction perpendicular to the rotating direction thereof and having a first side and a second side opposite to the first side in the width;
   exposure means for scanning said photoreceptors with a plurality of laser beams to write plural color component latent images, including
   a laser generator to generate the plurality of laser beams,
   a rotatable polygon mirror having a mirror at each edge sides thereof to reflect a laser beam so as to scan the photoreceptor in the width direction, wherein the polygon mirror receives two laser beams at two mirrors thereof which are arranged diagonal to each other and reflects the two laser beams in the opposite directions to each other so that a first laser beam of the two laser beams scans from the first side to the second side on the photoreceptor and a second laser beam scans from the second side to the first side;
   wherein a laser beam position most upstream than the other laser beam writes at the first side of the photoreceptor a latent image of a reference position mark which is developed into a visible reference position mark;
   signal means for outputting first and second position signals independently when the first and second laser beams pass respectively the reference position mark provided at the first side on the photoreceptor; and control means for controlling exposure means in accordance with the position signals so that the start timing of the first laser beam to write a latent image is determined on the basic of the first position signal which is obtained in the current scanning line of the first laser beam and the start timing of the second laser beam to write a latent image is determined on the basis of the second position signal which has been obtained in the previous scanning line of the second laser beam.

* * * * *